United States Patent [19]
Takigawa et al.

[11] 3,843,243
[45] Oct. 22, 1974

[54] DEVICE TO ADJUST APERTURE OPENING ANGLE OF MOTION PICTURE CAMERA

[75] Inventors: Tomoshi Takigawa; Masamichi Toyama, both of Tokyo, Japan

[73] Assignee: Canon Kabushiki Kaisha, Tokyo, Japan

[22] Filed: Sept. 18, 1973

[21] Appl. No.: 398,457

[30] Foreign Application Priority Data
Sept. 22, 1972  Japan.............................. 47-95304

[52] U.S. Cl................. 352/209, 352/216, 352/166, 352/190
[51] Int. Cl. ............................................ G03b 9/10
[58] Field of Search .......... 352/208, 209, 216, 166, 352/190

[56] References Cited
UNITED STATES PATENTS
943,253  12/1909  Meredith-Jones ................. 352/190

1,851,448  3/1932  Ross ............................... 352/190 X
3,196,457  7/1965  Buck .............................. 352/216 X Primary Examiner—Monroe H. Hayes
Attorney, Agent, or Firm—Toren, McGeady and Stanger

[57] ABSTRACT

A device to adjust the aperture opening angle of a motion picture camera is characterized in that a first elliptical shutter gear is arranged to drive a cam, preferably an eccentric cam in the shape of a triangle to drive film feeding claws upwards and downwards. The device includes shutter blade with a certain determined opening angle in rotation, a second elliptical shutter gear in engagement with the first shutter gear and a driving mechanism to drive the second gear in rotation, whereby the proper opening angle of the shutter blade is varied effectively by means of a group of the elliptical gears.

10 Claims, 13 Drawing Figures

Ratio of Transferred Angular Speed

Phase Angle of an Idler

Phase Angle of Shutter Gear

Phase Angle of an Idler

FIG.12

FIG.13

DEVICE TO ADJUST APERTURE OPENING ANGLE OF MOTION PICTURE CAMERA

BACKGROUND OF THE INVENTION

1. Field of the Invention

The present invention relates to a device to adjust the aperture opening angle of a motion picture camera and particularly a device to adjust the aperture opening angle, in which, as the aperture opening mechanism elliptical gears are used instead of aperture opening means in such a manner that the effective aperture opening angle can freely be adjusted.

2. Description of the Prior Art

So far many kinds of mechanisms have been used to vary the opening angle of the shutter blade in a motion picture camera. The opening angle of the shutter blade in such mechanisms is usually chosen below 180°, generally more or less 160°, since the aperture is opened once during each cycle of rotation of the shutter blade to expose one picture piece or frame of film, while at the next moment the aperture is closed to feed the film by a distance equal to one picture piece. Based on the aperture angle and the number of rotations of the shutter shaft the exposure time for one picture piece of film is decided, whereby there is often the case that an obscure object can not be photographed. Further in case of a slow motion picture which is taken at high speed (usually 45-54 picture pieces per second) the time for film feeding is decided by the shutter opening angle and the number of rotations of shutter shaft so that there exists a difficulty in film feeding in the case of very high speed slow motion picture (usually more than 100 picture pieces per second). These difficulties come from the fact that the rotation of the shutter shaft is constant during the above mentioned cycle. Consequently it is convenient if the rotation speed of the shutter shaft during the cycle is relatively high while the film is exposed, and relatively low while the film is fed.

SUMMARY OF INVENTION

The first object of the present invention is to offer a device to adjust the aperture opening angle of a motion picture camera in which a first elliptical shutter gear for driving a cam, preferably an eccentric cam in shape of triangle, drives film feeding claws upwards and downwards and further involves at least one shutter blade with a certain determined opening angle in rotation, a second elliptical shutter gear in engagement with the first shutter gear and a driving mechanism to drive the second gear in rotation, whereby the fading operation can be carried out by varying the opening angle of the shutter blade effectively from the proper angle.

The second object of the present invention is to offer a concrete means to enlarge the proper opening angle of the shutter blade effectively.

The third object of the present invention is to offer a device to adjust the aperture opening angle of motion picture camera in which a means to vary the opening angle of the shutter blade is provided in such a manner that the fading-out operation can be performed together with the possibility of enlarging the opening angle of the shutter blade from the proper opening angle effectively.

The fourth object of the present invention is to offer a concrete means to make the opening angle of the shutter blade variable.

The fifth object of the present invention is to offer a device for adjusting the aperture opening angle of motion picture camera in which the aperture is covered by the shutter blade whenever the drive of the camera comes to stop.

DESCRIPTION OF THE PREFERRED EMBODIMENTS

Figure 1:
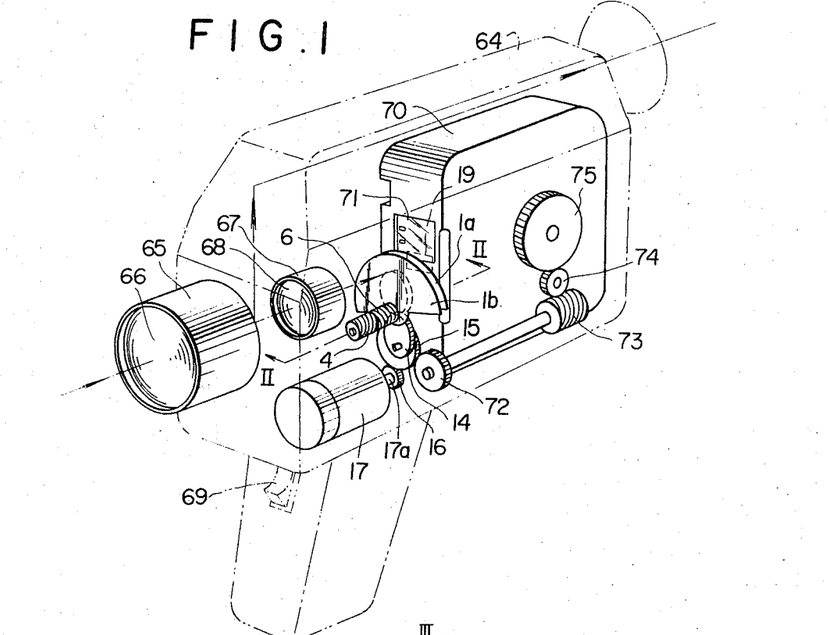
FIG. 1 is a perspective view of an embodiment of a motion picture camera which is equipped with a device to adjust the aperture opening angle according to the present invention.

FIG. 1 shows the arrangement of a motion picture camera which is equipped with a device to adjust the aperture opening angle according to the present invention.

Figure 2:
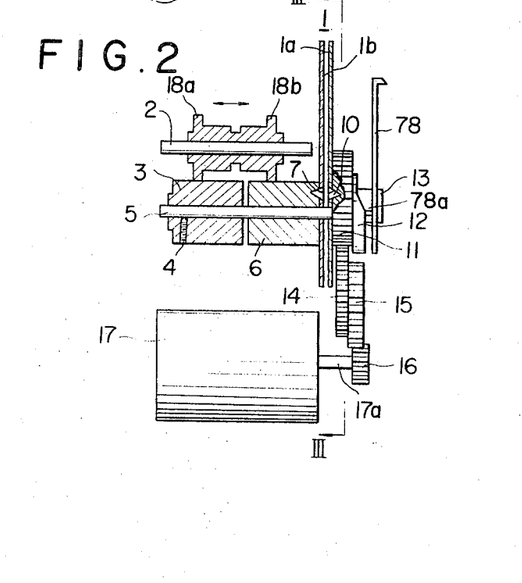
FIG. 2 shows a section taken along line II—II of FIG. 1 of the device to adjust the aperture opening angle according to the present invention.

FIG. 2 is a sectional view of the device to adjust the aperture opening angle according to the present invention taken along the line II—II of FIG. 1.

Figure 3:
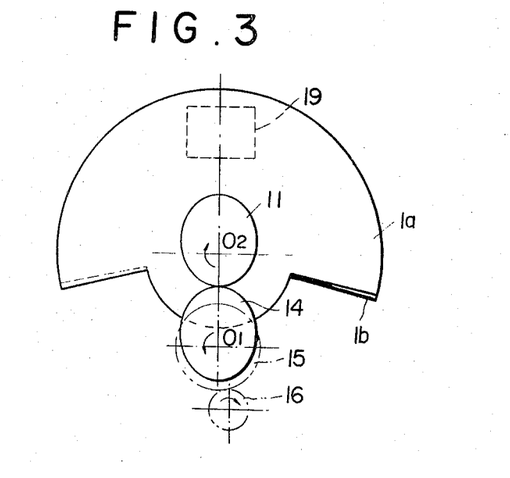
FIG. 3 shows a section along the line III—III of FIG. 2.

FIG. 3 is a view along the line III—III of FIG. 2. In the drawings 64 is the main body of the motion picture camera, 65 a frame body holding the photographing optics, 67 a frame body holding the relay optics 68, and 69 a release button. Shutter blades are each in the shape of a segment, of which one is the main blade 1a and the other is the subsidiary blade 1b. As explained later, the main blade 1a is fixed on the shutter gear 11 by means of a screw 10, whereby the shutter gear 11 is fixed on the shutter shaft 5. A helical gear 3 for the main blade is fixed on the shutter shaft 5 by means of the screw 4. The subsidiary blade 1b is fixed on the helical gear 6 for the subsidiary blade by means of the screw, whereby the helical gear 6 for the subsidiary blade is slidably mounted on the shutter shaft 5.

Helical gears 18 for varying the opening angle consist of helical gears 18a and 18b which engage with the helical gear 3 for the subsidiary blade and with the helical gear 6 for the main blade, whereby the rotation of the helical gear 3 for the main blade is usually conveyed to the helical gear 6 for the subsidiary blade in such a manner that the helical gear 3 for the main blade and the helical gear 6 for the subsidiary blade are rotated at the same speed. They are rotatably and slidably mounted on the shaft 2, and when they are slid along the shaft by a certain means not shown in the drawing, by this sliding motion the helical gear 18 for varying the opening angle rotates and displace the shaft of the helical gear 6 of the subsidiary blade as if the helical gear 18 fixed the helical gear 3 for the main blade. The rotation of the helical gear 18 for varying the opening angle is conveyed to the helical gear 6 for the subsidiary blade, so that the subsidiary blade 1b is rotated in a position displaced from the main blade 1a. The position varies according to the amount of slide of the helical gear 18 for varying the opening angle, whereby the angle made by the main blade and the subsidiary blade is varied.

17 is a driving motor, on whose rotating shaft 17a, a motor gear 16 is fixed. 15 is an idler gear in engagement with the motor gear 16. The motor gear 16 and the idler gear 15 are both circular gears, while on the other hand the idler gear 14 fixed on the shaft of the idler gear 15 is an elliptical gear and the shutter gear 11 in engagement with the idler gear 14 is also an elliptical gear. A face cam 12 is mounted on the shutter gear 11 on the shutter shaft, whereby against the face of the cam the pin 78a of the film feeding claw 78 is pressed by means of a spring, not shown. A non circular cam 13, preferably in the shape of a triangle, is eccentrically mounted on the shutter shaft 5, whereby against the face of the cam the feeding claw is pressed in such a manner that the feeding claw 78 is always in contact with the cam face and according to the shape of the cam the feeding claw 78 is moved upwards and downwards in FIG. 1. 19 is the aperture part of the motion picture camera. 70 is the magazine in which the film 71 is contained, whereby by means of the spur toothed gears 72, 74, 75 and worm gear 73 the driving force from the motor 17 is conveyed to the film winding shaft of the film magazine 70.

Below the operation is explained according to FIGS. 4 to 7.

In FIG. 3 the shutter blade 1 and the aperture 19 are shown in the position after having finished photographing, whereby the shutter blade 1 stands still, covering the aperture. At this time the elliptical gears 11 and 14 are arranged with their longer axis one above the other along a line, whereby the axis of the rotating shafts $O_1$ and $O_2$ are respectively situated at the focuses of the elliptical gears.

By means of the engagement of both elliptical gears the idler gear 15 to which a power is conveyed from the motor 17 rotates at a constant speed, while the rotation angular speed of the shutter shaft 5 varies. The state of this variation is explained below.

Figure 4:
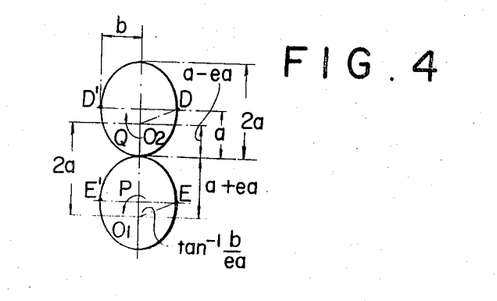
FIG. 4 is a sketch to explain the engagement of the elliptical gears shown in FIGS. 2 and 3.
Figure 5:
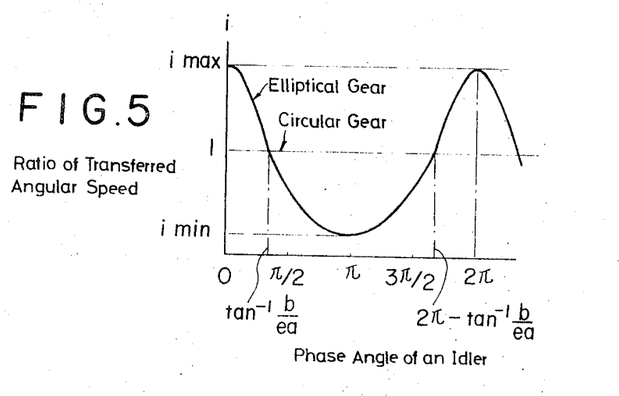
FIG. 5 is a diagram showing the rotation of the transferred angular speed of both elliptical gears shown in FIG. 4, whereby the rotation phase angle of the idler gear is shown along the abscissa.

FIG. 4 shows the elliptical gears 11 and 14 illustrated in FIG. 3, whereby for the sake of simplicity both elliptical gears are each shown as a mere ellipsis. The idler gear 14 and the shutter gear 11 have congruent form, whereby the length of the longer axis is taken as $2a$ while that of the shorter axis is taken as $2b$. Let the radius from the center $O_1$ of the rotation of the idler gear to the engaging point be $a_1$ and the radius from the center $O_2$ of the rotation of the shutter gear 11 be $a_2$, and the ratio of i of the transferred angular speed from the idler gear 14 to the shutter gear 11 is expressed by $a_1/a_2$. Let the eccentricity of both elliptical gears 11 and 14 considered as ellipsis be $e$, and each dimension is as shown in FIG. 4. The maximum and the minimum of the ratio of the transferred angular speed is obtained as follows. At this time the rotation phase angle of the idler gear 14 and that of the shutter gear 11 play an important part. Let the position of both gears shown in FIG. 4 be that in which the rotation phase angle is zero and both gears rotate along the direction of the arrows P and Q by 360° to return to the original position shown in the drawing, and during one cycle of this a picture piece of film is exposed and the exposed piece is fed. The position in which the transferred angular speed $i$ is maximum is shown in FIG. 5, when the transferred angular speed $$i \max = a + ea/a - ea$$

while the position in which the transferred angular speed $i$ is minimum assumed when the rotating phase angle of the idler gear 14 is $\pi$ and the then transferred angular speed $$i \min = a - ea/a + ea$$

On the other hand the transferred angular speed $i$ is 1, when the distances from the centers $O_1$-$O_2$ of rotation of the gears to the engaging point are equal to each other, namely when D and D' come in touch with E and E' as shown in the drawing, whereby the rotating phase angle of the idler gear is $\tan^{-1} b/ea$, respectively $2\pi - \tan^{-1} b/ea$. On the other hand let the gears 11 and 14 be circular gears, whereby $e = 0$, and the transferred angular speed $i$ is always 1. In order to show the situation, in FIG. 5 the variation of the transferred angular speed is shown in such a manner that the rotating phase angle (in radian) of the idler gear is taken along the abscissa, while the ratio $i$ of the transferred angular speed is taken along the ordinate.

Figure 6:
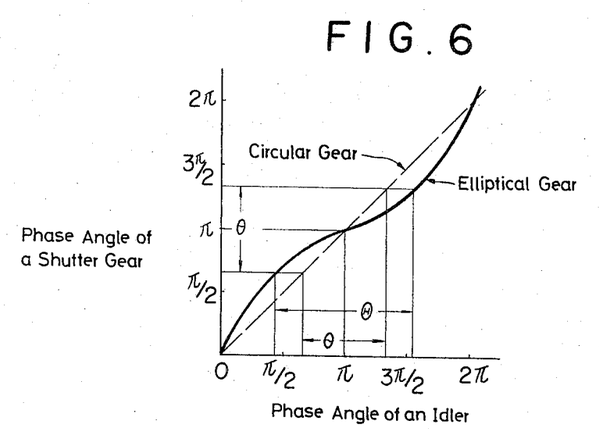
FIG. 6 is a diagram of the trace of the rotation phase of the shutter gear relative to the rotation phase angle of the idler gear.

In the drawing the case of the elliptical gear illustrated in FIG. 4 is shown as a solid line, while the case with the circular gear is shown as a dotted line. It is clear from the drawing that the ratio of the transferred angular speed of the elliptical gears varies periodically much more than that of the circular gears. In order that the situation be understood much easier, the variation of the rotating phase angle of the shutter gear relative to the variation of the rotating phase angle of the idler gear is shown in FIG. 6 in comparison with the case of the circular gears. Hereby the rotation phase angle shown along the abscissa of the idler gear as well as that along the ordinate of the shutter gear are shown in radian. From this drawing the advance and the delay of the rotating phase of the shutter gear which is rotated by the idler gear out of the state shown in FIG. 4, toward the idler gear is clearly understood. Namely as is shown in the drawing neither the advance nor the delay of the rotating phase of the shutter gear which is circular toward the idler gear which is also circular exists. On the other hand in the case of the engagement of the elliptical gears 11 and 14, the rotation phase angle of the shutter gear 11 is in advance toward the idler gear 14 whose rotation phase angle is between 0 and $\pi$, while the rotation phase angle of the shutter gear 11 is in delay toward the idler gear 14 whose rotation phase angle is between $\pi$ and $2\pi$.

Figure 7:
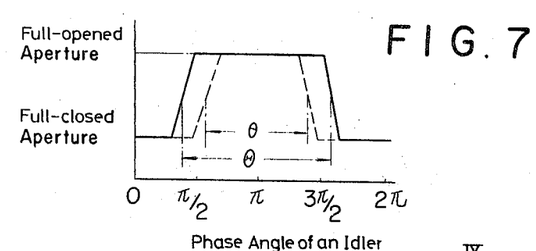
FIG. 7 is a diagram of the total opening and closing of the aperture relative to the rotation phase angle of the idler gear.

In short the advance and the delay of the rotation phase of the shutter gear 11 toward the idler gear 14 takes place smoothly, having one-half rotation of the idler gear as transient point. The shutter blade 1a fixed on the shutter gear 11 present the opening angle $\theta$, about 160° in case the aforementioned cam 13 is circular and about 170° in case the cam is not circular, whereby, when starting from the position shown in FIG. 3, the aperture part 19 of the motion picture camera is, around the shutter shaft 5, namely the position in which the shutter gear 11 rotates by 180°, as center, about 80° in case of circular cams and about 85° in case of non circular cams, in opened state. Because there exist the advance and the delay in the phase of the shutter gear toward the idler gear, when the opening angle $\theta$ of the fully opened shutter blade is, converted in the phase angle of the idler gear, indicated on the scale of the phase angle of the shutter gear shown in FIG. 6, the effective opening degree is larger than the opening degree $\theta$ of the ordinary circular gear as shown by ⓗ. FIG. 7 shows this state by means of the time in which the aperture 19 is totally opened and closed, whereby eventually along the abscissa the rotation phase angle of the idler gear 14 is shown in radian, while, the number of rotation of the idler gear 14 being constant, the abscissa can be considered as a time factor to show one cycle. The time $\theta$ in which the aperture is totally opened as shown in a dotted line by means of the ordinary circular gear can be prolonged in its effective time as shown by ⓗ, in the case of the elliptical gears according to the present invention. In short it can be said that the shutter opening angle of 160° to 170° the degree above which has so far been unrealizable has been enlarged up to an angle degree more than 180° practically, which means the increase of the exposure time so that range of the proper exposure can be said to have been enlarged in such a manner that an obscure object out of the range of the proper exposure can also be photographed. It goes without saying that the time in which the aperture is totally closed, namely, in which the film is fed, shortened by the enlarged time for exposure, and in this period the shutter shaft is rotated more quickly than in other period, namely, the movement of the film feeding claw 18 is accelerated so that there takes place no problem. Further though the rotational angular speed of the shutter shaft 5 varies, the variation of the movement of the film feeding claw 78 is synchronized because the face cam 12 and the eccentric cam 13 are mounted on the shutter shaft respectively.

The shutter blades 1 are especially composed of two blades, whereby, by driving the helical gears 18 and 19 along the direction of the arrow in FIG. 2, the opening angle of the main blade 1a and the subsidiary blade 1b can relatively be changed from the totally closed state into the totally opened state or inversely. Namely there takes place a great advantage that by adopting the elliptical gears the opening angle can be enlarged up to, for example, 230°, while the total closure can be realized by means of the two shutter blades. Although it has already been known that the opening angle proper to the shutter blade can be enlarged by converting the circular cam into a non circular cam, from "Die Kinematographische Kamera" page 217 by HARALD W.E.I. published by Die Wissenschaftliche und Angewandte Photographie 1955, according to the present invention as shown in FIG. 2 the eccentricity of the elliptical gears can be chosen small to enlarge the opening angle when the opening angle proper to the shutter blades is taken as nearly 180° in case a non circular cam is used as the cam 13, which is advantageous in view of noise production.

Figure 8:
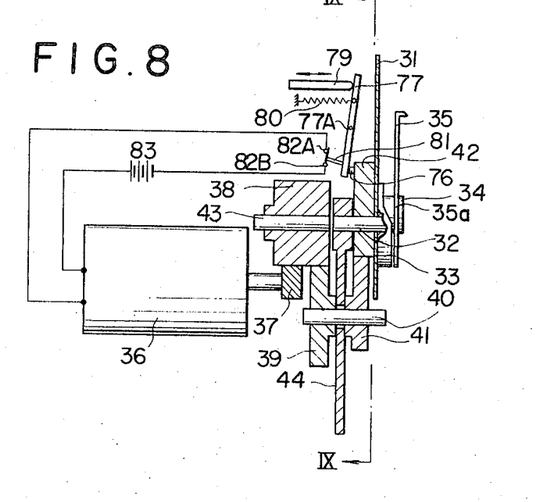
FIG. 8 shows a section of another embodiment of the device to adjust the aperture opening angle in a motion picture camera in accordance with the present invention.
Figure 13:
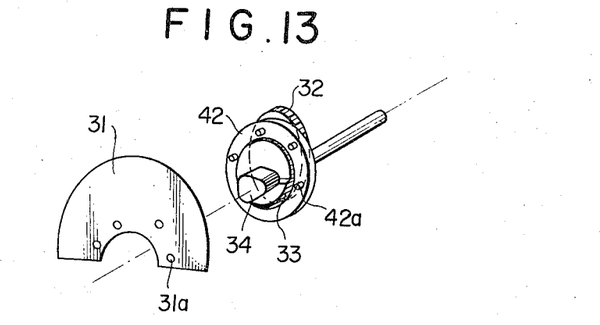
FIG. 13 is a perspective view of the shutter blade shown in FIG. 8 in engagement with the shutter shaft.

FIG. 8 shows another embodiment of the device according to the present invention, whereby, different from the device shown in FIG. 2, the relative positions of the elliptical gears are made variable in such a manner that the effective opening degree can freely be adjusted. In the drawing a shutter blade 21 is dismountably fixed on the shutter shaft 32. A face cam 33 is fixed on the shutter shaft, and is always in contact with the pin 35a on the film feeding claw 35, while 34 is the eccentric cam fixed on the shutter shaft 32, whereby the film feeding claw 35 is always in contact with the face of this cam. Hereby the film feeding claw 35 repeats intermittent movements by the mutual effect of the above mentioned two cams. A motor 36 drives the motion picture camera, a gear 37 is fixed on the shaft of the motor 36, another gear 38 rotates around a shaft 43 as center in engagement with the gear 37, and a circular idler gear 39 is in engagement with the gear 38, whereby on shaft 40 of the idler gear 39 an elliptical idler gear 41 is fixed. Another elliptical shutter gear 42 is fixed on the shutter gear 32, in engagement with the elliptical idler gear 41, whereby, as shown in detail in FIG. 13, on the side face of the elliptical gear 42 a plural number of the pins 42a are provided in such a manner that the pins 42a can be inserted in the holes 31a provided on the shutter blade so that at the time of manufacturing the shutter shaft 32 the center of gravity can easily be determined by fixing the shutter blade 31 and the shutter shaft 32. A a stopper member 77 is pivotted on the shaft 77A and equipped with a T-shaped conductive member 81, whereby the stopper member 77 is always pulled anticlockwise by a spring 80. An electric source 83 drives the motor 36 and is connected to terminals 82A and 82B of the motor driving circuit, which circuit is closed when the T-shaped member 81 is brought into contact with the terminals 82A and 82B. A trigger member 79 is slidable in the lengthwise direction and is situated in a position to come in contact with the member 77, whereby the member 77 can be rotated by the sliding movement of the member 79. A pin 76 is provided on the side surface of the elliptical gear 42, whereby the pin 76 is arranged in a position to come into engagement with the stopper member 77, because the stopper member 77 is pressed against the side surface of the elliptical gear 42 by means of the spring 80, when the trigger member 79 is out of effect, namely when the trigger member 79 is displaced away from the shutter blade 31. The position at which the pin 76 and the stopper member 77 are brought into engagement with each other is adjusted to correspond with that at which the shutter blade covers the aperture 19.

If in this way the trigger member 79 is operated and displaced toward the shutter blade 31, the stopper member 77 is rotated clockwise in such a manner that the engagement of the stopper member 77 with the pin is discontinued while the member 81 is brought into contact with the terminals 82A and 82B of the motor driving circuit, whereby the motor driving circuit is closed and the motion picture camera is driven. If on the other hand the trigger member 79 is brought out of operation, namely, displaced away from the shutter blade 31, the stopper member 77 is rotated anticlockwise, whereby the engagement of the member 81 with the terminals 82A and 82B of the motor driving circuit is broken so that the motor driving circuit is interrupted while at the same time the member 81 is brought into contact with the pin 76 in such a manner that the elliptical gear 42 steps at the position at which the shutter blade 31 covers the aperture 19.

Figure 9:
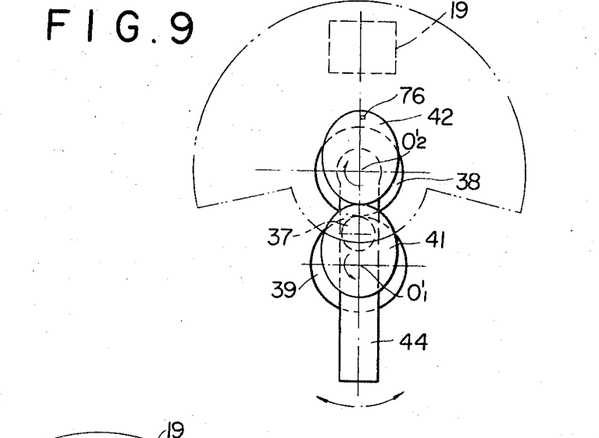
FIG. 9 is a section along the line IX—IX in FIG. 8.
Figure 10:
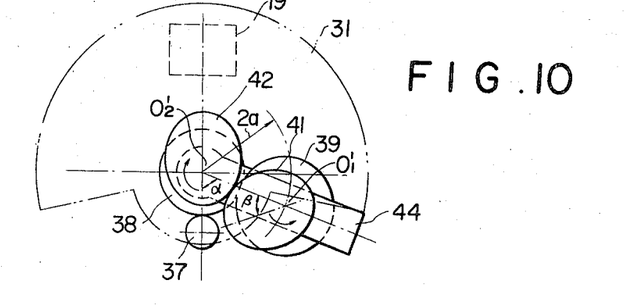
FIG. 10 shows a section of the adjusting lever shown in FIG. 9 in adjusted state.

An adjusting lever 44 operatively connected to the elliptical gear 41 varies engagement positions of the elliptical gears 41 and 42, and is usually situated at the position shown in FIG. 9. FIG. 10 shows the adjusting lever 44 turned from the position shown in FIG. 9, whereby the position of the engagement of the elliptical gears 41 and 42 is different from the position shown in FIG. 9.

In the same way as the explanation concerning the embodiment of FIG. 2 and of FIGS. 3-7 it is clear that the time during which the aperture part 19 of the motion picture camera is totally opened by the shutter blade 31 is long enough in the state shown in FIG. 9 in view of the fact that the effective opening angle is increased from $\theta$ up to $\bigoplus$, so that the exposure time for one picture piece of film is prolonged, and accordingly, the explanation of FIG. 9 is omitted.

Figure 11:
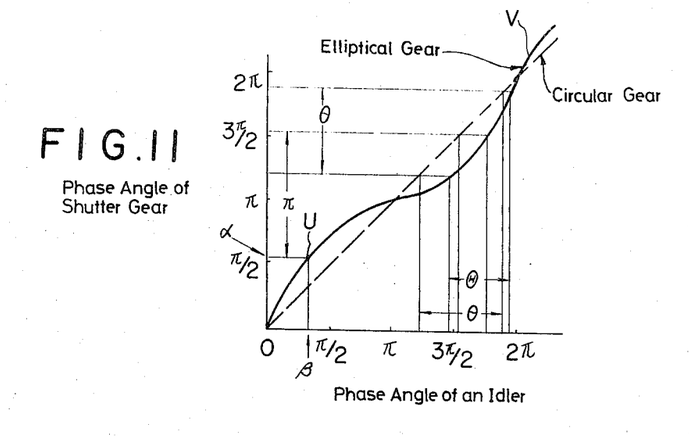
FIG. 11 is a diagram of the trace of the rotation phase of the shutter gear relative to the rotation phase angle of the idler gear to explain the mechanism of opening angle adjustment of the devices shown in FIG. 8 to FIG. 10.

It is impossible to vary the exposure time in the aforementioned embodiment, while in this embodiment the engagement of the elliptical gears 41 and 42 can be adjusted by means of the adjusting lever 44 in order that the exposure time can be adjusted freely. Now let the lever turn from the position shown in FIG. 9 by an angle $\alpha$ to the right to the position shown in FIG. 10 and obtain the angles which are made by the lines passing the engaging point of the shutter gear 42 with the idler gear 41 and the axis $O_2'$ and $O_1'$ of the rotation and by the longer axis, so the angle at the side of the shutter gear 42 is $\alpha$ while that at the side of the idler gear 41 is $\beta$. In this way both gears 41 and 42 are driven from the position shown in FIG. 10 according to the direction of the arrow in such a manner that the exposure and feeding of film is started. In comparison with FIG. 9, in FIG. 10 the angle opening mechanism starts its operation from the state in which both elliptical gears 41 and 42, shown in FIG. 8 are by $\beta$ and $\alpha$ in advance in phase, respectively. This operation is explained according to FIG. 11. As in FIG. 6, in FIG. 12 the rotation phase angle of the idler gear 41 is shown in radians along the abscissa while the rotation phase angle of the shutter gear 42 is shown also in radians along the ordinate, whereby the trace of the rotation phase of the elliptical gear and that of the circular gear are shown in such a manner that the cycle starts out of the state shown in FIG. 9.

On the other hand with reference to the rotation phase curve shown in FIG. 10 the starting point of the cycle of rotation is not the origin of coordinates although the form of the trace is as shown in the drawing. Namely the idler gear 41 is by $\beta$ in advance in the rotation angular phase while the shutter gear 42 is by $\alpha$ in advance in the rotation angular phase so that a cycle starts at the point U in the drawing and ends at the point V, the point which is $2\pi$ in advance of the point U. Then the effective degree of the opening angle $\theta$ of the shutter blade 31 is the distance between the two points on the abscissa, at which the line $\pi + \alpha + \theta/2$ and that $\pi + \alpha - \theta/2$ on the ordinate cross with the curve of the rotation phase.

At the same time the opening angle $\theta$ in case of a circular gear is also shown in such a manner that from both curves it is easily understood that the angle $\theta'$ varies toward $\theta$, whereby whether the varied effective opening angle $\theta'$ is larger or smaller than the opening angle $\theta$ in case of the circular gear quite depends upon the adjustment of the adjusting lever 44. Thus it is possible to vary even the effective opening angle $\theta'$ of the single blade shutter by varying the adjustment of the lever 44.

Theoretically the adjustment of this adjusting lever is possible from 0° to 180°. It is also easily possible that the shutter can be composed of two blades instead of single blade in order to obtain the fading effect.

Further, if the effective opening angle of the shutter blade is adjusted to be smaller than the opening angle $\theta$ of the circular gear, the time during which the shutter blade covers the aperture can be taken longer in such a manner that the film feeding time can also be longer, whereby the film feeding is at a very high speed, for example about 72 picture pieces or frames per second, can be realized with much ease and sureness as compared with the conventional way, which is very advantageous for stabilized slow motion photography.

Figure 12:
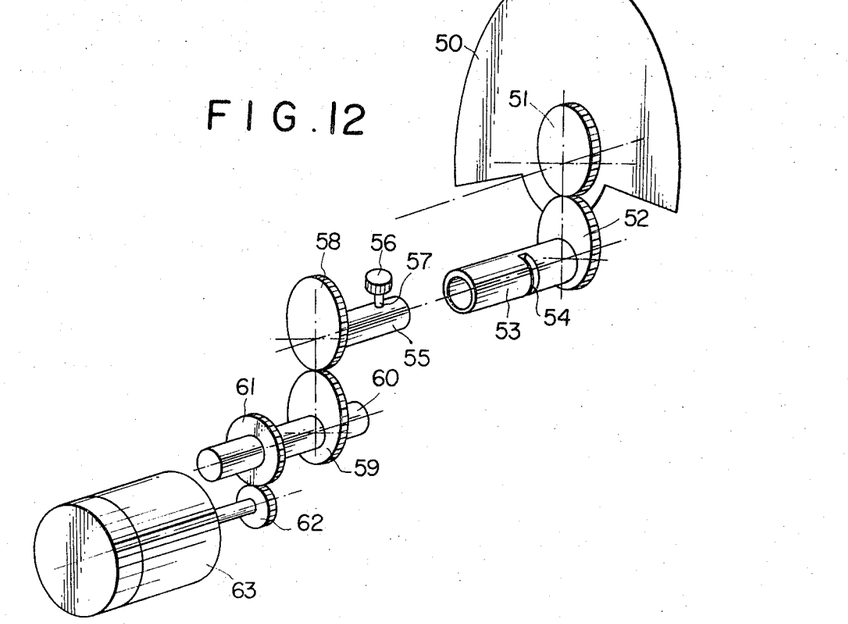
FIG. 12 shows another embodiment of the device in a disassembled perspective view to adjust the aperture opening angle according to the present invention.

FIG. 12 shows another embodiment of the device according to the present invention, whereby the elliptical gears as mentioned are arranged in two steps in such a manner that the relative angle between the elliptical gear in the first step and that in the second step is freely variable in order to obtain the same purpose as in embodiment shown in FIGS. 8 and 10.

In FIG. 12, a shutter blade 50 is shown presenting a certain opening degree $\theta$, an elliptical gear 51 is fixed in such a manner that the one of focuses of the elliptical gear is situated at the center of the shutter blade and a first elliptical idler gear 52 is in engagement with the shutter gear 51, whereby at one of the focuses of the gear 52 a first external shaft 53 is fixed. The first external shaft 53 is in the shape of a hollow cylinder with a guide groove 54 on its outer circumferential periphery. A first internal shaft 55 is inserted in the first external shaft 53 and presents a pin 57 with a fixing screw 56, which pin engages in the guide groove 54 of the first external shaft 55. A second idler elliptical gear 58 has one of its focuses fixed at the end of the first external shaft 55. A third idler elliptical gear 59 is in engagement with the second idler elliptical gear 58, and one of its focusses is fixed at the shaft 60. A circular idler gear 61 is fixed on the shaft 60 of the third idler elliptical gear 59 and engages with a gear 62 fixed on the shaft of a motor 63 for driving the motion picture camera. As to the film feeding claw, the face cam for driving the claw, the eccentric cam and so on, the explanations concerning FIG. 8 can be applied.

How the effective opening angle of the shutter blade 50 can be adjusted is explained below.

Suppose that there were neither the second nor the third elliptical idler gears 58, 59 and the first external shaft 53 is driven directly with the circular idler gear 61, the enlargement of the effective opening angle by means of the elliptical gear shown in FIGS. 2 to 7 and FIG. 9 could be obtained. On the other hand in the embodiment shown in FIG. 12 beside the first elliptical gear 52 the second and third elliptical gears 58 and 59 are provided in such a manner that the relative position of the second and third elliptical gears to the first elliptical gears can be adjusted. This composition consists in the first external shaft 53, the first internal shaft 55 to be inserted in the first external shaft 53, the adjusting pin 57 and the guide groove 54. If the internal shaft 55 and the external shaft 53 which engage with each other as shown in the drawing are fixed with the fixing screw 56 at their positions and the shutter blade 50 is driven with the motor 63, the situation is just the same as shown in FIG. 9. In the aforementioned embodiment the position of the engagement of the shutter gear with the idler elliptical gear is adjusted by the adjusting lever 44, while in this embodiment the position of the engagement of the internal shaft 55 and the external shaft 53 is changed by sliding the pin 57 in the groove 54, the relative angle between the second idler gear 58 and the first idler gear 52 is changed and then fixed by the screw 56, whereby the driving power is conveyed to the shutter blade 50 from the motor 63. By changing the relative angle between both elliptical gears 58 and 52 the position of the engagement between the third idler gear 59 and the second idler gear 58 is changed, which means that the relative angle between the second idler gear 58 and the first idler gear 52 is changed so that the adjustment of the effective opening degree of the shutter blade 50 can be carried out all the more, increasing the efficiency of the adjustment further. It goes without saying that in this embodiment it is possible to obtain the efficiency of fading out by composing the shutter with two blades.

According to the present invention it is possible to increase the effective opening degree of the shutter blade and thus the exposure time by adopting elliptical gears for the shutter gear and the idler gear in engagement with the shutter gear, and further not only to increase the effective opening degree of the shutter blade by adjusting the position of the engagement of the elliptical gears with each other but also much more easily to decrease the effective opening degree than by means of the circular gears, which is very profitable. In case the effective opening degree is increased by varying the effective opening degree, the number of the picture pieces to be photographed is not changed and the substantial exposure can be taken longer in such a manner that it becomes possible to photograph such object whose brightness is too low for a conventional device, which contributes much to the operation of the motion picture camera. In case the effective opening degree is decreased, the time during which the aperture is covered by the shutter blade becomes longer which means the substantial time for feeding film is increased so that the film feeding at very high speed can be carried out much more easily than by means of the conventional device, which is very profitable.

What is claimed is:

1. In a device for adjusting the aperture opening angle of a motion picture camera in which the rotational speed of the shutter shaft in one cycle is relatively slow when a film is exposed and is relatively fast when the film is fed, the improvements comprising;
    a first shutter blade engaged with the shutter shaft;
    a second shutter blade idly engaged with the shutter shaft;
    opening angle varying means for varying substantially the opening angle between the first and second shutter blades, said means having rotating means for making the first and second shutter blade rotate cooperatively;
    first elliptical rotating means engaged with the shutter shaft;
    second rotating means positioned in a contacting relation to the first rotating means;
    driving means for driving the second rotating means; and
    adjusting means for varying the relative position between the second rotating means and the first rotating means and varying substantially a proper opening angle formed between the first and second shutter blades.

2. A device according to claim 1, which further comprises;
    a first helical gear engaged with the shutter shaft;
    a second helical gear engaged with the shutter blade and idly mounted on the shutter shaft;
    a rotation gear having one helical gear engaged with the first helical gear and another helical gear engaged with the second helical gear, whereby when the rotation gear is slid in the direction of the shutter shaft, the second helical gear varies its axial rotation position in respect to the first helical gear.

3. A device according to claim 1, in which the first rotating means is a gear.

4. A device according to claim 1, in which the second rotating means is a gear.

5. A device according to claim 1, in which the adjusting means varies the position of the rotation center of the second rotating means without varying the rotation center distance between the first and second rotating means.

6. In a device for adjusting the aperture opening angle of a motion picture camera, in which a rotation speed of a shutter shaft in one cycle is relatively slow when a film is exposed, and is relatively fast when the film is fed, the improvements comprising;
    at least one shutter blade engagable with the shutter shaft;
    a first elliptical rotating means engaged with the shutter shaft;
    a second rotating means arranged in a contacting relation with the first rotating means;
    a driving means for driving the second rotating means;
    adjusting means for varying the relative position of contact between the first rotating means and the second rotating means, and varying substantially the opening angle proper to the shutter blades; and restricting means for stopping the first rotating means at a predetermined position, which stops the first rotating means at a position at which the shutter blade covers the aperture when the driving means stops.

7. A device according to claim 6, in which the restricting means further comprises;
    a first engaging means arranged on the first rotating means;
    a second engaging means engagable selectively with the first engaging means.

8. A device according to claim 7, in which the second engaging means has means which actuates the driving means when it engages with the first engaging means and brings the driving means into non-operative condition when it is disengaged with the first engaging means.

9. A device according to claim 6, in which the adjusting means varies the rotation center of the second rotating means without varying the rotation center distance between the first and second rotating means.

10. In a device for adjusting aperture opening angle of a motion picture camera, in which the rotation speed of a shutter shaft in one cycle is relatively slow when a film is exposed and is relatively fast when the film is fed, the improvements comprising;

a first shutter blade engaged with the shutter shaft;

a second shutter blade idly mounted on the shutter shaft;

opening angle varying means for substantially varying the opening angle between the first and the second shutter blades;

a first elliptical rotating means engaged with the shutter shaft;

a second rotating means arranged in a contacting relation to the first rotating means;

driving means for driving the second rotating means;

adjusting means for varying the relative position between the second rotating means and the first rotating means; and restricting means for stopping the first rotating means at a predetermined position, which stops the first rotating means at a position at which the shutter blade covers the aperture when the driving means stops.

* * * * *